United States Patent [19]

Takabayashi et al.

[11] Patent Number: 5,239,171
[45] Date of Patent: Aug. 24, 1993

[54] PHOTOGRAPHING APPARATUS BALANCING BRIGHTNESS FOR MICROSCOPES

[75] Inventors: Yutaka Takabayashi; Hiromi Utsunomiya, both of Hachiouji; Takashi Nagano, Nerima; Jitsunari Kojima, Akikawa, all of Japan

[73] Assignee: Olympus Optical Co., Ltd., Tokyo, Japan

[21] Appl. No.: 842,256

[22] Filed: Feb. 27, 1992

[30] Foreign Application Priority Data

Apr. 26, 1991 [JP] Japan .................. 3-097413

[51] Int. Cl.$^5$ .................. H01J 3/14; G01J 1/32; G03B 17/48
[52] U.S. Cl. .................. 250/205; 250/216; 354/79; 356/73; 359/388
[58] Field of Search .................. 250/201.3, 205, 229, 250/216, 201.1, 237 R; 354/79; 359/370, 371, 388; 356/73

[56] References Cited

U.S. PATENT DOCUMENTS

| | | | |
|---|---|---|---|
| 3,987,463 | 10/1976 | Nishikawa et al. | 354/79 |
| 4,475,802 | 10/1984 | Onogi | 354/79 |
| 4,555,620 | 11/1985 | Bridson et al. | 359/388 |
| 4,643,540 | 2/1987 | Kawasaki et al. | 359/388 |
| 4,756,611 | 7/1988 | Yonekubo et al. | 359/370 |
| 4,803,352 | 2/1989 | Bierleutgeb | 250/201.3 |
| 4,837,595 | 6/1989 | Leiter et al. | 354/79 |
| 4,897,537 | 1/1990 | Miyamoto et al. | 250/201.3 |
| 5,046,834 | 9/1991 | Dietrich | 359/370 |

FOREIGN PATENT DOCUMENTS

| | | |
|---|---|---|
| 54-71652 | 6/1979 | Japan . |
| 59-172618 | 9/1984 | Japan . |
| 60-37538 | 11/1985 | Japan . |
| 61-185025 | 11/1986 | Japan . |
| 63-19810 | 2/1988 | Japan . |

Primary Examiner—David C. Nelms
Assistant Examiner—Michael Messinger
Attorney, Agent, or Firm—Cushman, Darby & Cushman

[57] ABSTRACT

A photographing apparatus for microscopes is constructed so that a simultaneous observation is made by overlapping an image of a sample formed by transmitted illumination with that formed by reflected fluorescence, in which signals for designating the simultaneous observation at once cause a second shutter for the transmitted illumination to be closed and a first shutter for the reflected fluorescence to be opened, the brightness of the sample image formed by the reflected fluorescence is measured by a light-detecting element disposed in an optical path for observation, and after a light-adjusting member for the transmitted illumination is controlled so that, based on data outputted from a memory device corresponding to a measured value, the brightness of the sample image by the transmitted illumination in the simultaneous observation is balanced with that of the sample image by the reflected fluorescence, the second shutter is opened. Thus, this photographing apparatus has advantages that whenever the microscopy is switched, an operator can dispense with the need for a fine adjustment of the amount of transmitted illumination light, with the resultant ease of operation, the balance adjustment of brightness in switching is made in a short time, and the bleaching of fluorescence of the sample can be suppressed.

4 Claims, 3 Drawing Sheets

PHOTOGRAPHING APPARATUS BALANCING BRIGHTNESS FOR MICROSCOPES

BACKGROUND OF THE INVENTION a) Field of the Invention

This invention relates to a photographing apparatus for microscopes which enables switching and simultaneous observations on a fluorescent sample by using transmitted and reflected illumination light.

b) Description of the Prior Art

In microscopes, the observation of a cell for a fluorescent sample has been made using reflected fluorescence in the past. With this fluorescence observation only, however, it is hard to find where the area of the cell emitting fluorescence is located in relation to the entire sample. Thus, in order to confirm the area of the cell emitting fluorescence which is hard to be recognized from the fluorescence observation while viewing the entire profile of the sample, phase-contrast and differential interference contrast observations making use of transmitted illumination light has come to be employed in combination with the reflected fluorescence observation so as to carry out a switching observation in which the transmitted illumination and reflected fluorescence observations are switched to each other or a simultaneous observation which is made by overlapping a reflected fluorescence image with a transmitted illumination image.

For the simultaneous observation on the reflected fluorescence and transmitted illumination images, the reflected fluorescence image, which is darker, needs the balance of brightness to be adjusted in comparison with a phase-contrast or differential interference contrast image formed by transmitted illumination light. Further, it also needs a very fine adjustment for the optimum simultaneous observation.

In the past, the adjustment of brightness of an image to be observed has been made by controlling the voltage of the light source for a transmitted illumination system or inserting an ND filter whenever the sample, microscopy, or the magnification of an objective lens is changed.

An example of the microscope equipped with such a light-adjusting means is set forth in Japanese Patent Preliminary Publication No. Sho 54-71652. Referring now to FIG. 1 showing a fundamental optical system of this microscope, illumination light emitted from a light source 1 for transmitted illumination, such as a halogen lamp or a tungsten lamp, is collected by a collector lens 2 and, after passing through a relay lens 3 and being reflected upward from a reflecting mirror 4, illuminates a sample 6 through a condenser lens 5. A transmitted image of the sample formed by the illumination light is magnified by an objective lens 7 and inclined at an angle easy of observation by an inclined prism 8 for splitting light to be observed through an eyepiece 9. Further, while split light traveling in a straight line from the inclined prism 8 is imaged on a film plane 10 for photography, part of the light split by a half mirror 11 on the way to the film plane 10 is conducted to a light-detecting element 12 for detecting the amount of light.

The amount of light detected by the light-detecting element 12 is compared with a preset level and thus the amount of light of the light source 1 is altered by a light-adjusting device 13. It follows from this that the sample image can be observed with the optimum amount of light according to, for example, the switchover of the objective lens.

Also, apparatus designed so that the amount of light of the light source for illumination light is adjusted, independently of the light-detecting element, according to the switchover of the objective lens, are described by Japanese Patent Preliminary Publication No. Sho 59-172618 and Japanese Utility Model Preliminary Publication No. Sho 61-185025.

Light-adjusting means proposed by Japanese Patent Publication No. Sho 60-37538 and Japanese Utility Model Preliminary Publication No. Sho 63-19810 are such that the illuminance of the image plane of illumination light is detected by the light-detecting element, such as a photoelectric converter, and the adjustment of the amount of light is made, according to the output of the light-detecting element, by an optical attenuator, such as a filter, disposed in an optical path for transmitted illumination. Similarly, the apparatus set forth in Japanese Patent Preliminary Publication No. Sho 59-172617 is adapted to adjust the amount of light in accordance with the switchover of the objective lens, using the optical attenuator.

Any of the foregoing prior art, however, is such that the amount of transmitted illumination light is changed by measuring the amount of light of the transmitted illumination image or according to the switchover of the objective lens while the sample is illuminated, or shows such an automatic light-adjusting means that the amount of reflected illumination light is changed by measuring the amount of light of the reflected fluorescence image. In any case, the prior art is designed so that the amount of illumination light is adjusted in such a manner that only when observations are made using one illumination light, the amount of light of the sample image formed by the illumination light is measured, thus enabling observations to be made with the optimum amount of light.

Hence, in the simultaneous observation on the reflected fluorescence and transmitted illumination images, the balance of brightness has been adjusted in such a way that an observer, while viewing the sample image, controls the voltage of the light source of the transmitted illumination system or inserts the ND filter into the optical path for transmitted illumination.

To position the sample and specify the area emitting fluorescence in making observations, however, a observation mode is frequently switched from the reflected fluorescence observation to the simultaneous observation or from the transmitted illumination observation (phase-contrast or differential interference contrast observation) to the simultaneous observation, and whenever the switchover is performed, the observer must adjust the brightness while viewing the sample image. This makes the operation of the microscope complicated. In addition, since in the reflected fluorescence observation the fluorescent staining of the sample is subject to bleaching due to excited light, it is important to reduce the time of irradiating the sample with the excited light, but there is the difficulty that such adjustment of the balance of brightness is so delicate that much time is required therefor.

SUMMARY OF THE INVENTION

It is, therefore, an object of the present invention to provide a photographing apparatus for microscopes which enables the simultaneous observation on transmission and reflection to be made so that the adjustment of the balance of brightness in the simultaneous observation is made in a short time and with simple operation, and bleaching of fluorescence of the sample can be suppressed.

To achieve this object, and in accordance with one aspect of the present invention, the photographing apparatus for microscopes is constructed so that the simultaneous observation can be carried out by overlapping the sample image formed by transmitted illumination light with that by reflected fluorescence, in which signals for designating the simultaneous observation at once cause a shutter disposed in the optical path for transmitted illumination to be closed and another shutter disposed in an optical path for reflected illumination to be opened, the brightness of the sample image formed by the reflected fluorescence is measured by a light-detecting element disposed in an observation optical system, and after a light-adjusting member disposed in the optical path for transmitted illumination is controlled so that, based on data read out from a memory section corresponding to the measured value, the brightness of the sample image by the transmitted illumination light in the simultaneous observation is balanced with that of the sample image by the reflected fluorescence, the shutter disposed in the optical path for transmitted illumination is opened.

Thus, for the simultaneous observation, the reflected fluorescence observation is first made in which the brightness of the sample image by the reflected fluorescence is measured by the light-detecting element, relational operations on the measured value and the data from the memory section are performed, the light-adjusting member is controlled so that the brightness of the sample image by the transmitted illumination light is balanced with that by the reflected fluorescence, the brightness of the sample image in the optical path for transmitted illumination is adjusted in a closed state of the shutter, and when the shutter is opened, the sample images by the reflected fluorescence and the transmitted illumination light can be observed at once and with mutually balanced brightness.

According to another aspect of the present invention, the photographing apparatus for microscopes is designed so that in multiple-exposure photography based on the reflected fluorescence and the transmitted illumination light, a first shutter disposed in the optical path for reflected fluorescence is opened to measure the brightness of the sample image formed by the reflected fluorescence by means of the light-detecting element disposed in an optical path for photography, the first shutter is closed when a proper exposure value is secured, the measured value is stored in a memory device, a second shutter disposed in the optical path for transmitted illumination is opened or a light source therein is turned on to measure the brightness of the sample image formed by the transmitted illumination light by means of the light-detecting element, and when light exposure is reached which is operated on the basis of the measured value stored in the memory device, the second shutter is closed, or the light source is turned off, or a third shutter disposed in the optical path for photography is closed, thereby causing multiple exposure to be completed.

After the first shutter is closed, members constituting the optical path for reflected fluorescence are electrically replaced with those constituting the optical path for transmitted illumination and then exposure relying on the transmitted illumination light will be commenced. Also, a two-dimensional area sensor may be employed as the light-detecting element.

By signals for photography, after the second shutter is closed or the light source is turned off, the first shutter as well as the third shutter is opened, and upon beginning exposure on the reflected fluorescence, photometry is carried out by the light-detecting element. When the photometric value reaches a proper exposure value, the first shutter is closed, followed by the closure of the third shutter. Subsequently, the members constituting the optical path for reflected fluorescence are automatically converted to those constituting the optical path for transmitted illumination and the third shutter is opened again. Next, the second shutter is opened or the light source is turned on to carry out the photometry through the light-detecting element. When the exposure of the transmitted illumination light reaches the balance suitable for multiple-exposure photography, based on the photometric data for fluorescence stored in the memory device, the second shutter is closed, or the light source is turned off, or the third shutter is closed. The first multiple exposure is thus completed. The opening and closing operation of the first shutter, namely, the adjustment of the light exposure in photography on the reflected fluorescence is spot-photometrically made on the basis of the photometric data at the peak and in the vicinity thereof, of brightness in the two-dimensional area sensor such as a diode array. The amount of the transmitted illumination light is measured as an average by the two-dimensional area sensor and after calculation, adjusted so as to balance with the photometric data for fluorescence.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
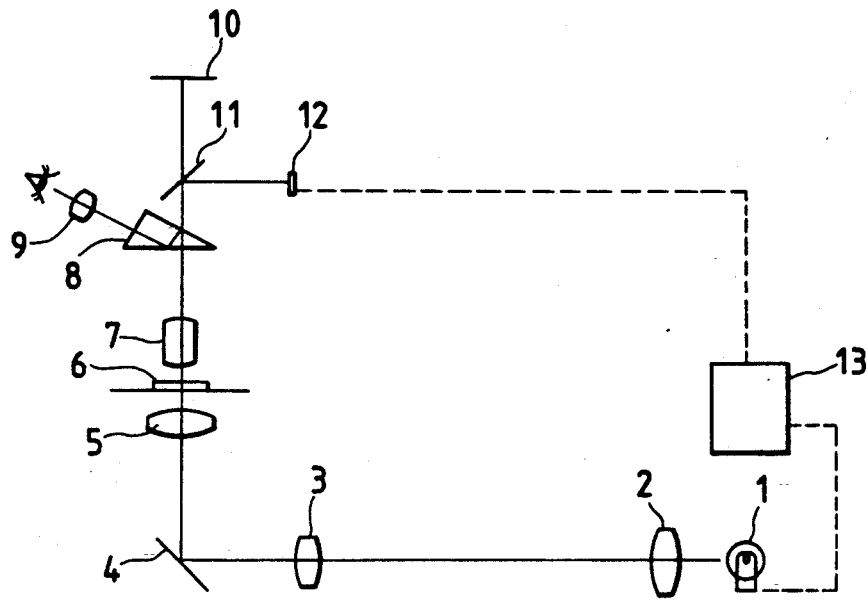
FIG. 1 is a view showing a fundamental optical system of a conventional photographing apparatus for microscopes.

In accordance with the embodiments shown in the drawings, in which like reference numerals are used to designate like members with the prior art shown in FIG. 1, the present invention will be described in detail below.

Figure 2:
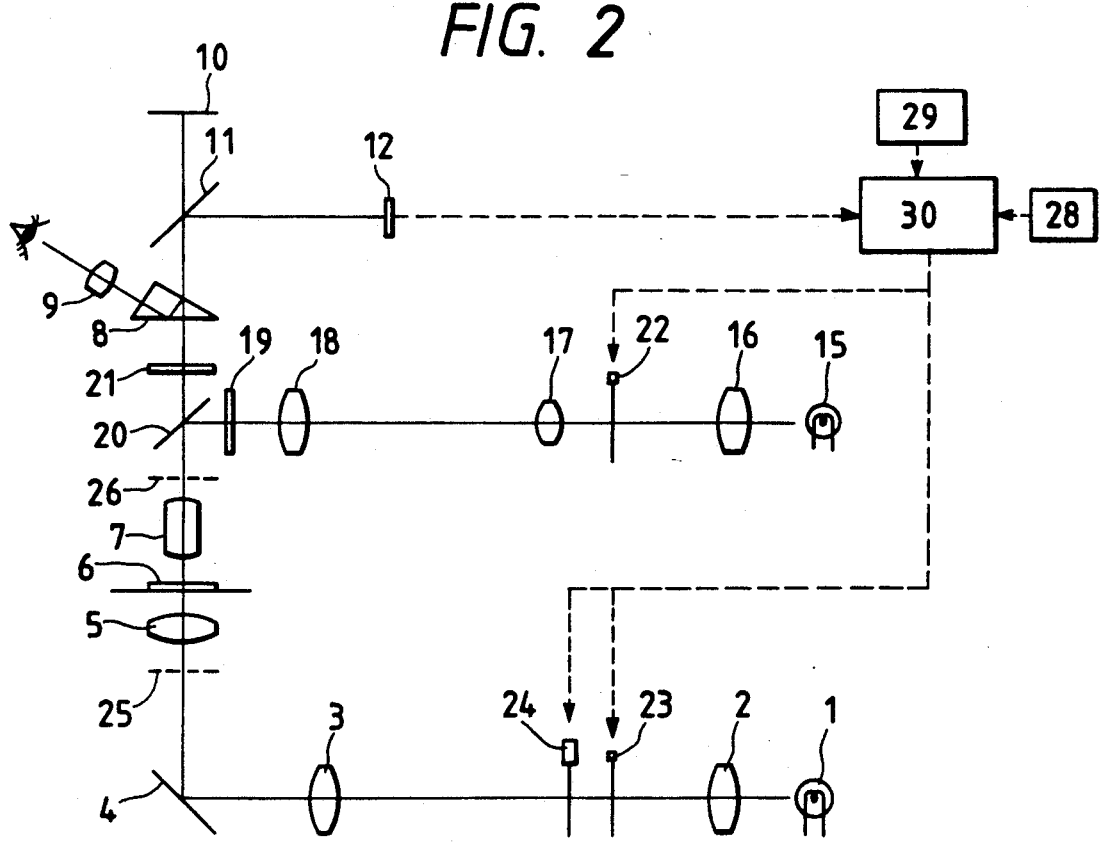
FIG. 2 is a view showing an optical system of a first embodiment of a photographing apparatus for microscopes according to the present invention.

FIG. 2 depicts the optical system of the first embodiment according to the present invention. In this figure, reference numeral 15 denotes a light source for reflected illumination, such as a mercury lamp, for irradiating the sample 6; 16 a condenser lens for reflected illumination light; 17 and 18 relay lenses; 19 an excitation filter; and 20 a dichroic mirror disposed between the objective lens 7 and the inclined prism 8 in an optical system for observation, which constitute a part of a reflected illumination system. Reference numeral 21 represents a barrier filter for splitting illumination light for reflected fluorescence observation and fluorescence emanating from the sample to transmit fluorescence only. The arrangement of the optical system is such that the excitation filter 19, the dichroic mirror 20, and the barrier filter 21, which are positioned in the optical path in the reflected fluorescence observation, are removed therefrom in transmitted illumination observation.

Reference numeral 22 represents a shutter for reflected illumination light disposed, for example, between the condenser lens 16 and the relay lens 17, in the optical path for reflected illumination and 23 a shutter for transmitted illumination light disposed, for example, between the collector lens 2 and the relay lens 3, in the optical path for transmitted illumination, each of which is opened or closed by means of control signals which will be described later, to be capable of transmitting or blocking the illumination light. Numeral 24 designates a light-adjusting member disposed, for example, adjacent to the shutter 23 for transmitted illumination light, in the optical path for transmitted illumination as well, for rotating or sliding contiguous ND filters to adjust the amount of transmitted light, for instance. The shutter 23 and the light-adjusting member 24 can be constructed as a single mechanism. Numerals 25 and 26 denote the positions of a ring slit and a Wollaston prism which are disposed in the optical path for transmitted illumination, for transmission phase-contrast observation or transmission differential interference contrast observation.

Reference numeral 28 represents a mode designating switch for designating any one of a transmitted illumination observation mode, a reflected fluorescence observation mode, and a simultaneous observation mode of the transmitted illumination and reflected fluorescence observations, and 29 a memory section for storing information to be compared with the measured value of the light-detecting element 12, which information is the data arbitrarily set, according to the observation mode and the magnification of the objective lens, by an observer, to indicate the controlled variable to be measured by the light-adjusting member 24, or which may be inputted as data relating to the magnification and type of the objective lens, as set forth in Japanese Patent Preliminary Publication No. Sho 59-172617, and to an aperture stop, the condenser lens, and the filter in the transmitted illumination system. In the case of the latter, the data allow the optimum brightness to be set according to the objective lens in the transmitted illumination observation. Numeral 30 represents a CPU (central processing unit) which accepts the inputs of the measured value of the light-detecting element 12 and the designated mode of the mode designating switch 28 and which calculates and outputs the control signals for driving the shutters 22 and 23 and the light-adjusting member 24 so that the measured value of the light-detecting element 12 and the data of the memory section 29 are compared for calculation, the control variable is determined to balance properly the brightness of an image formed by the transmitted illumination light against that formed by the reflected fluorescence, and the light-adjusting member 24 is actuated to adjust the amount of transmitted illumination light.

Figure 3:
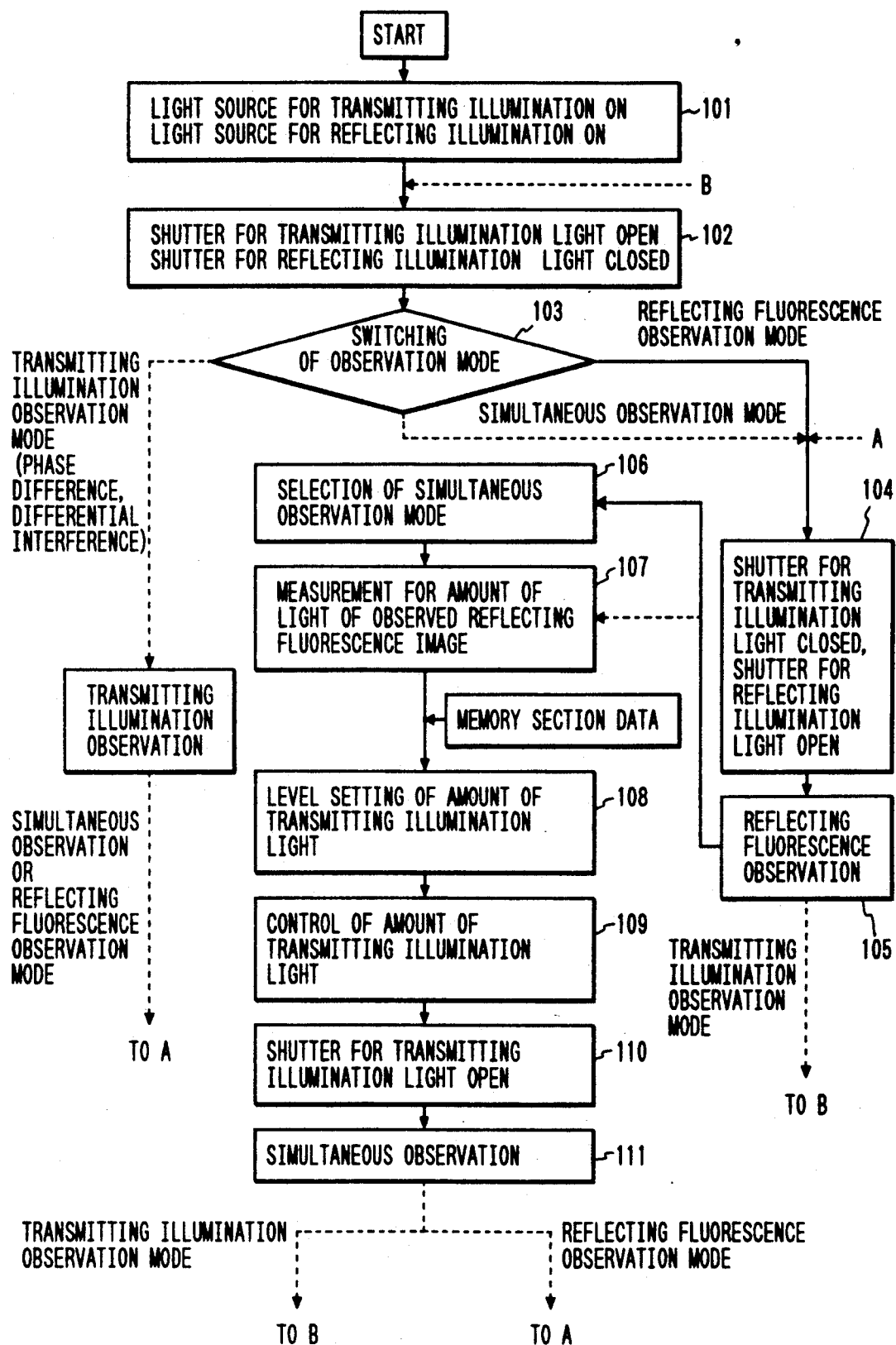
FIG. 3 is a flow chart showing the operational procedure of the first embodiment.

Referring now to a flow chart shown in FIG. 3, the function of the first embodiment constructed as mentioned above will be explained.

First of all, when a power supply is put to work, the light source 1 for transmitted illumination and the light source 15 for reflected illumination are turned on (Step 101). At this time, the observation mode is also automatically set to the transmitted illumination observation mode by the CPU 30, and the shutter 23 for transmitted illumination light and the shutter 22 for reflected illumination light are controlled to be opened and closed, respectively (Step 102). In the transmitted illumination observation mode, the focusing and positioning of the sample 6 are determined for observation. The reason why the optical path for reflected illumination is in a closed state is that fluorescence of the sample is prevented from bleaching.

Next, to make the reflected fluorescence observation, when the observation mode is switched over to the reflected fluorescence observation mode with the mode designating switch 28 (Step 103), the excitation filter 19, the dichroic mirror 20, and the barrier filter 21 are inserted in the optical path. Then, the CPU 30, in which the signals for the reflected fluorescence observation mode have been inputted, switches the shutter 23 to be closed and the shutter 22 to be opened (Step 104), thereby blocking the transmitted illumination light and conducting the reflected illumination light to the sample 6. The reflected fluorescence observation is thus carried out (Step 105).

Further, in order to make sure where the area of the cell emitting fluorescence recognized in the reflected fluorescence observation is located with respect to the whole of the sample 6, the observation mode is switched to the simultaneous observation mode with the mode designating switch 28 (Step 106). When the signal of the simultaneous observation mode is inputted into the CPU 30, the measured value of brightness of the reflected fluorescence image received by the light-detecting element 12 is entered into the CPU 30 (Step 107), and the data previously stored in the memory section 29 are sent to the CPU 30 to perform the comparison and calculation so that an adequate balance in brightness between the reflected fluorescence and transmitted illumination observation images is maintained. Subsequently, the control variable is determined which is adjusted corresponding to the measured value of the light-detecting element 12 (Step 108), and based thereon, the light-adjusting member 24 is actuated by the control signal so that the amount of light of the optical path for transmitted illumination blocked by the shutter 23 is reduced, as necessary, for example, by the lamp voltage of the light source 1 (Step 109). After that, the shutter 23 is opened (Step 110) and the simultaneous observation is carried out (Step 111).

In this way, the brightness of the transmitted illumination image is automatically adjusted to the level corresponding to that of the reflected fluorescence image, and the whole of the sample 6 and the area of the cell emitting fluorescence can be observed at once with two kinds of images overlapped.

The above description is made of a flow in the case where the observation modes are selected which are switched from the transmitted illumination observation, through the reflected fluorescence observation, to the simultaneous observation, but actually, there are various flows such as modes switched from the transmitted illumination observation to the simultaneous observation, etc. Any flow available is such that prior to the simultaneous observation, the reflected fluorescence observation mode is selected in which to measure the amount of light for observing the reflected fluorescence image by the light-detecting element 12, the shutter 23 for transmitted illumination light is closed and the shutter 22 for reflected illumination light is opened.

According to the first embodiment of the present invention, as mentioned above, when the simultaneous observation for transmitted illumination and reflected fluorescence is selected, the brightness of the sample image by the transmitted illumination light is automatically adjusted to balance with that by the reflected fluorescence, so that whenever the observation mode is switched, an operator can dispenses with the need for a delicate adjustment of the amount of, for example, the transmitted illumination light, with a resultant simple operation. Additionally, the balance adjustment of the brightness in switching the observation mode will be made in a short time and the bleaching of fluorescence of the sample can be diminished.

The operation of the switchover between the reflected fluorescence mode and the transmitted illumination mode with the switch 28 may be performed with another switch for electrically inserting and removing the excitation filter 19, the dichroic mirror 20, and the barrier filter 21 at once into and from the optical path.

Figure 4:
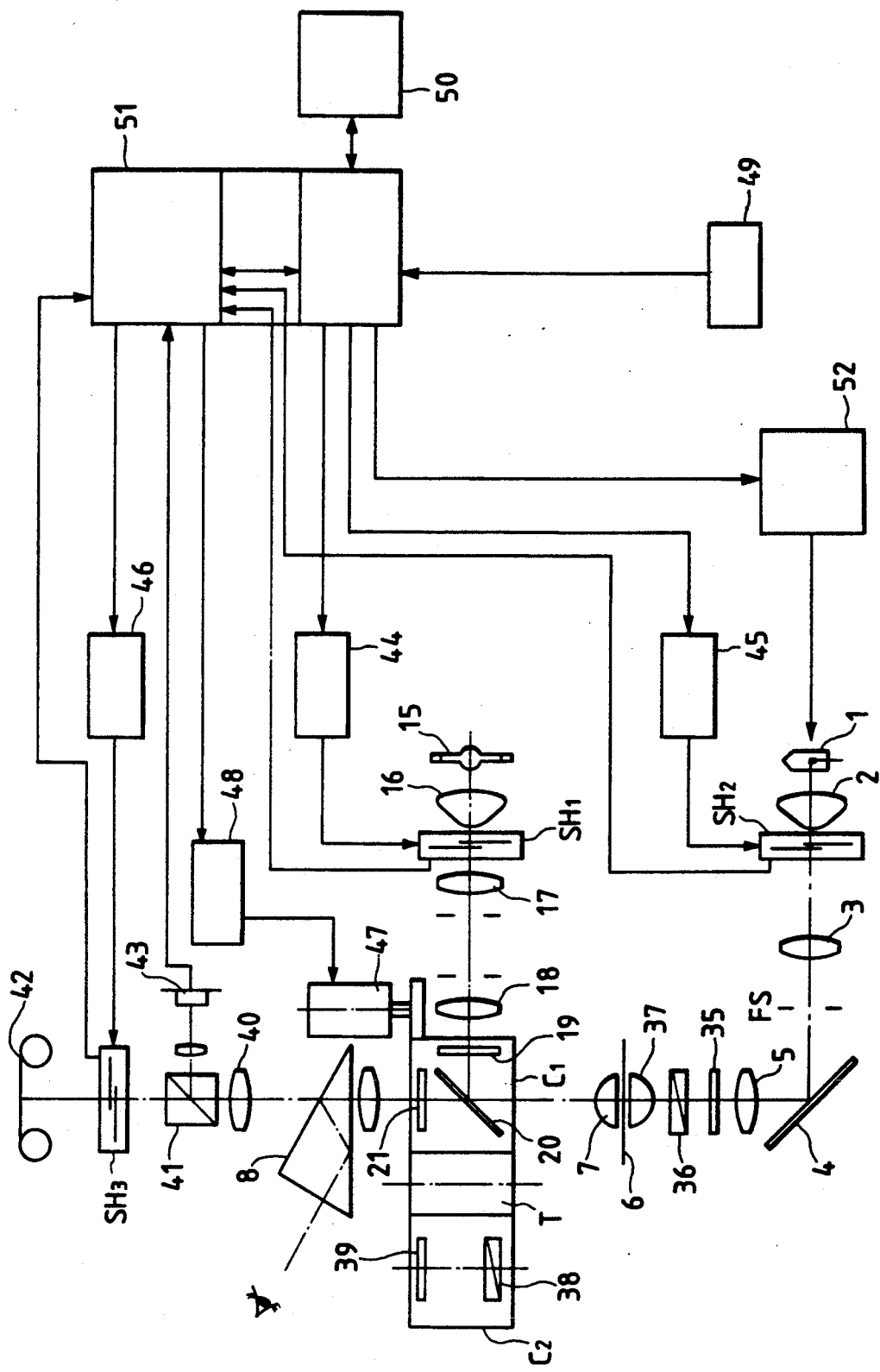
FIG. 4 is a view showing an optical system of a second embodiment.

FIG. 4 shows the optical system of the second embodiment according to the present invention. This embodiment, unlike the first embodiment, is designed so that the excitation filter 19, the dichroic mirror 20, and the barrier filter 21 are incorporated in a single fluorescence cube $C_1$ and although inserted into the optical path by a turret T, as shown, in the reflected fluorescence observation, removed from the optical path in the transmitted illumination observation. Reference numeral 35 represents a polarizer; 36 a differential interference contrast prism such as the Wollaston prism; 37 a condenser; 38 a differential interference contrast prism identical with numeral 36; and 39 an analyzer, among which the differential interference contrast prism 38 and the analyzer 39 are incorporated in a single differential interference contrast cube $C_2$ and when inserted into the optical path by the turret T, constitute a part of the transmitted illumination system. Although in this instance the transmitted illumination system is constructed to be suitable for a differential interference contrast microscopy, the polarizer 35 and the differential interference contrast prism 36 in the case of other microscopy are replaced with other optical elements, and the differential interference contrast prism 38 and the analyzer 39 are removed from the optical path by turning the turret T. For example, where a transmission phase-contrast microscopy making use of reflected fluorescence is applied, a fluorescence phase-contrast objective lens with a phase ring is employed as the objective lens 7 and a phase-contrast condenser with a ring slit as the condenser 37.

Reference numeral 40 denotes a photographic eyepiece; 41 a light-splitting prism; 42 a photographic film; and 43 a two-dimensional area sensor, such as a CCD (charge coupled device), for detecting light split by the prism 41 to determine the light exposure, which constitute a photographing system. The two-dimensional area sensor 43 is adapted to measure spot-photometrically the data at the peak or in the vicinity thereof, of the brightness in the reflected fluorescence photography and to perform mean photometry in the transmitted illumination photography.

Reference symbol $SH_1$ represents a shutter for reflected illumination light (a first shutter) disposed, for example, between the condenser lens 16 and the relay lens 17, in the optical path for reflected fluorescence illumination; $SH_2$ a shutter for transmitted illumination light (a second shutter) disposed, for example, between the collector lens 2 and the relay lens 3, in the optical path for transmitted illumination; and $SH_3$ a shutter for photography (a third shutter) disposed, for example, between the light-splitting prism 41 and the photographic film 42, in the optical path for photography.

Reference numeral 44 denotes a driver for opening and closing the first shutter $SH_1$; 45 a driver for opening and closing the second shutter $SH_2$; 46 a driver for opening and closing the third shutter $SH_3$; 47 a driving motor for driving the turret T; 48 a driver for controlling the drive of the motor 47; 49 an input section for selecting and designating any one of a transmitted illumination photographing mode, a reflected fluorescence photographing mode, and a multiple-optical path photographing mode for transmitted illumination light and reflected fluorescence, for inputting the sensitivity of the photographic film 42, and for commencing photography; 50 a memory device for storing data (the light exposure required according to the sensitivity of the photographic film used) to be compared with the measured value of the two-dimensional area sensor 43 as the light-detecting element; and 51 a CPU for comparing the measured value of the two-dimensional area sensor 43 with the data stored in the memory device 50 for calculation to drive properly the shutter drivers 44, 45, and 46, for adequately driving the turret driver 48 to insert the corresponding cube $C_1$ or $C_2$ into the optical path, and for calculating and outputting various control signals for temporarily storing the photometric data of reflected fluorescence to make comparison and calculation while measuring the amount of transmitted illumination light and to drive properly the shutter drivers 45 and 46.

Next, reference is made to the function of the second embodiment. First of all, when the power supply is put on, the light source 15 for reflected fluorescence illumination and the light source 1 for transmitted illumination are turned on. At this time, the photographing apparatus is set to a transmitted illumination observation mode by the CPU 51, and the shutters $SH_1$, $SH_2$, and $SH_3$ are controlled to be closed, opened, and closed, respectively. In the transmitted illumination observation mode, the focusing and positioning of the sample 6 are determined for observation.

Subsequently, a multiple-exposure photographing mode on transmitted illumination and reflected fluorescence is set by the input section 49 and the shutter $SH_2$ is then switched to be closed. The two-dimensional area sensor 43 changes to a spot-photometric mode and the turret T is turned by the motor 47 so that the fluorescence cube $C_1$ is inserted into the optical path. The shutter $SH_3$ is opened and the sensitive surface of the photographic film 42 is exposed in the optical path for photography. After this, the shutter $SH_2$ is opened to start the reflected fluorescence photography and the photometry at the peak or in the vicinity thereof, of the brightness in the two-dimensional area sensor 43 at once. When calculation is being performed in comparison with the data of a required exposure of the memory device 50 and the amount of received light reaches the required exposure, the shutter $SH_1$ is closed. The actual exposure data in this instance are temporarily stored in the CPU 51 and the two-dimensional area sensor 43 is switched over to a mean-photometric mode.

Next, the shutter $SH_3$ is closed, the turret T is again driven, and the fluorescence cube $C_1$ is removed from the optical path, a combined microscopy with transmitted differential interference contrast light being thus performed. In this case, instead, the transmission differential interference contrast cube C₂ is inserted into the optical path. The shutter SH₃ is opened and subsequently the shutter SH₂ is also opened to start the exposure of the transmitted illumination light. At the same time, the mean photometry of the two-dimensional area sensor 43 is started. When the light exposure reaches the required amount of light in comparison with the reflected fluorescence exposure data stored in the CPU 51, the shutter SH₂ is closed and the shutter SH₃ is also closed to complete the multiple-exposure photography. Thus, a multiple photograph can be brought about in which the brightness of the transmitted light image is balanced with that of the reflected light image.

Although the foregoing has referred to the multiple-exposure photography on the reflected fluorescence and the transmitted light, a multiple compound photography on fluorescence corresponding to a multiple fluorescence-stained sample can be carried out in such a way that the data of a required light exposure for each exposure are previously stored in the memory device 50 and the process of the reflected fluorescence photography is repeated several times.

Where the repetitive operation is performed, it is also possible to provide each shutter with a signal generator for informing the CPU 51 of its opening or closing state so that the operation is smoothly controlled.

In the second embodiment, the arrangement has been made so that the opening and closing operation of the second shutter, namely, of the shutter SH₂ for transmitted illumination light is adequately controlled by the CPU 51. Alternatively, the photographing apparatus may be designed so that a power device 52 for transmitted illumination is disposed between the light source 1 for transmitted illumination and the CPU 51 and controlled by the CPU 51 to make the light source 1 blink.

According to the second embodiment, as stated above, in the multiple-exposure photography on the transmitted light and the reflected fluorescence, the brightness of the sample image on the transmitted illumination is automatically adjusted to balance with that of the sample image on the reflected fluorescence, so that whenever the observation mode is switched over, an operator can dispense with the need for the delicate adjustment of the amount of light such as the transmitted illumination light and can easily perform the operation in a short time. Further, it is not necessary to determine the light exposure by the photometry of fluorescence during the photography, or to position a photometric area in order to measure spot-photometrically the amount of fluorescence by using the two-dimensional area sensor as the light-detecting element, or to effect the irradiation of excited light, except for the photography, thus enabling the bleaching of fluorescence of the sample to be reduced. Moreover, since the reflected fluorescence and transmitted light photographies are separately carried out and the optical members unnecessary for each illumination can be automatically removed from the optical path, it is possible to detect even dark fluorescence in the fluorescence photography and take a clearer multiple-exposure photograph by starting simply the operation of the apparatus. Also, since the adjustment of the transmitted illumination is made by the opening and closing operations of the shutter for transmitted illumination light or by the blink of the light source for transmitted illumination, the light-adjusting member, for example, having contiguous ND filters, will not be required. In addition, the exposure time is determined while the amount of transmitted light is measured in the photography, so that it is unnecessary to store previously the presence of filters disposed in the transmission optical path and the correcting data of the diameters of stops in the CPU for calculation. Thus, an extremely useful photographing apparatus for microscopes can be provided.

What is claimed is:

1. A photographing apparatus for microscopes, comprising:

a light source for reflected fluorescence illumination;

a first shutter disposed in an optical path for reflected fluorescence illumination;

a light source for transmitted illumination;

a second shutter disposed in an optical path for transmitted illumination;

a light-adjusting member disposed in said optical path for transmitted illumination, for adjusting an amount of transmitted light;

a light-detecting element disposed in an optical path for observation; and memory means, wherein a simultaneous observation is made by overlapping an image of a sample formed by the transmitted illumination with that formed by the reflected fluorescence, and wherein signals for designating said simultaneous observation at once cause said second shutter to be closed and said first shutter to be opened, brightness of the sample image formed by the reflected fluorescence is measured by said light-detecting element, and after said light-adjusting member is controlled so that, based on data outputted from said memory means corresponding to a measured value, the brightness of the sample image formed by the transmitted illumination in said simultaneous observation is balanced with that of the sample image formed by the reflected fluorescence, said second shutter is opened.

2. A photographing apparatus for microscopes, comprising:

a light source for reflected fluorescence illumination;

a first shutter disposed in an optical path for reflected fluorescence illumination;

a light source for transmitted illumination;

a second shutter disposed in an optical path for transmitted illumination;

a third shutter disposed in an optical path for photography;

a light-detecting element disposed in said optical path for photography; and memory means, wherein in multiple-exposure photography based on reflected fluorescence and transmitted light, said first shutter is opened to measure brightness of an image of a sample formed by the reflected fluorescence by means of said light-detecting element, said first shutter is closed when a proper light exposure is reached, a measure value is stored in said memory means, said second shutter is opened to measure the brightness of the sample image formed by the transmitted light by means of said light-detecting element, and when the light exposure is reached which is operated on the basis of the measured value stored in said memory means, one of said second shutter and said third shutter is closed to thereby complete multiple exposure.

3. The photographing apparatus according to claim 2, wherein after said first shutter is closed, members constituting said optical path for reflected fluorescence illumination are electrically replaced with members constituting said optical path for transmitted illumination and then exposure on the transmitted light is started.

4. The photographing apparatus according to claim 2 or 3, wherein a two-dimensional area sensor is used as said light-detecting element.

* * * * *